United States Patent
Hedlund et al.

(10) Patent No.: US 12,073,216 B1
(45) Date of Patent: Aug. 27, 2024

(54) TRANSPOSITION OF LEFT-HAND-SIDE OPERAND TO SYSTOLIC MATRIX MULTIPLICATION

(71) Applicant: Google LLC, Mountain View, CA (US)

(72) Inventors: Matthew Leever Hedlund, Sun Prairie, WI (US); Christopher Aaron Clark, Madison, WI (US); Andrew Everett Phelps, Middleton, WI (US); Thomas James Norrie, San Jose, CA (US); Sushma Honnavara-Prasad, Los Gatos, CA (US); Vinayak Anand Gokhale, Austin, TX (US); Pareesa Ameneh Golnari, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/109,583

(22) Filed: Feb. 14, 2023

(51) Int. Cl.
*G06F 9/30* (2018.01)
*G06F 17/16* (2006.01)

(52) U.S. Cl.
CPC ...... *G06F 9/30036* (2013.01); *G06F 9/30032* (2013.01); *G06F 17/16* (2013.01)

(58) Field of Classification Search
None
See application file for complete search history.

(56) References Cited

U.S. PATENT DOCUMENTS

| 8,417,758 | B1 | 4/2013 | Rao et al. |
| 10,698,976 | B2 | 6/2020 | Phelps et al. |
| 11,360,934 | B1 | 6/2022 | Abts et al. |
| 2018/0336163 | A1 | 11/2018 | Phelps et al. |
| 2019/0065149 | A1 | 2/2019 | Hansen et al. |
| 2021/0124560 | A1* | 4/2021 | Liu ............ G06F 7/5277 |

OTHER PUBLICATIONS

International Search Report and Written Opinion for PCT Application No. PCT/US2023/082647, dated Mar. 28, 2024. 12 pages.

* cited by examiner

*Primary Examiner* — Scott C Sun
(74) *Attorney, Agent, or Firm* — Lerner David LLP

(57) ABSTRACT

In a system including vector registers storing right-hand side data and left-hand side data, first and second matrix staging registers, and a systolic array of processing cells for conducting matrix multiplication operations using the right-hand side data and left-hand side data, one or more processors load the right-hand side data from the vector registers to the first matrix staging register based on an instruction indicating whether to transpose the right-hand side data, load the left-hand side data from the vector registers into the second matrix staging register based on another instruction indicating whether to transpose the left-hand side data, load the right-hand side data from the first matrix staging register into the systolic array, and, in a cycle of the matrix multiplication operation, pass one or more columns of the left-hand side data from the second matrix staging register to a column of the systolic array.

20 Claims, 7 Drawing Sheets

TRANSPOSITION OF LEFT-HAND-SIDE OPERAND TO SYSTOLIC MATRIX MULTIPLICATION

BACKGROUND

Accelerators for neural networks, such as deep neural networks (DNN), have leveraged systolic arrays for high-density computation. Systolic arrays are arrays of processing elements, such as processors, microprocessors, or specialized circuitry configured to process some data. Adjacent processing elements of a systolic array can be connected through one or more interconnects, e.g., wires or other physical connections, for example, on a printed circuit board.

Existing systolic arrays leverage one or more matrix multiplication units (MXU) within a processor to perform matrix multiplication operations. One or both sets of left-hand side and right-hand side operands of the matrix multiplication operation may be transposed so that the processors can achieve high performance for matrix multiplication. For an array of right-hand side operands that are loaded into the systolic array prior to the matrix multiplication operation, it may be possible to transpose the operands during the loading process. However, for the vectors of left-hand side operands that are typically streamed into the systolic array from the vector arrays, the operands cannot be transposed without first being passed through a dedicated transpose unit and back to the vector arrays before being streamed into the systolic array. This results in increased bus traffic, adding latency and bandwidth costs to the matrix multiplication operation since both the MXU and the dedicated transpose unit must be supported. The added latency and bandwidth costs, in turn, weaken the overall performance advantage of transposition.

BRIEF SUMMARY

The present disclosure provides a new MXU architecture that provides for left-hand operands to be transposed within the MXU prior to being streamed into the systolic array. As such, the matrix multiplication operations may be performed with high efficiency for both transposed and non-transposed data, including for both transposed right-hand operand data and transposed left-hand operand data.

In one aspect of the present disclosure, a system includes: a plurality of vector registers storing right-hand side data and left-hand side data; a first matrix staging register; a second matrix staging register; a systolic array comprising a matrix of processing cells for conducting a matrix multiplication operation using the right-hand side data and the left-hand side data; and one or more processors configured to: load the right-hand side data from the plurality of vector registers to the first matrix staging register based on a first instruction indicating whether to transpose the right-hand side data in the systolic array; load the left-hand side data from the plurality of vector registers into the second matrix staging register based on a second instruction indicating whether to transpose the left-hand side data in the systolic array; load the right-hand side data from the first matrix staging register into the processing cells of the systolic array; and in a cycle of the matrix multiplication operation, pass one or more columns of the left-hand side data from the second matrix staging register to a column of processing cells of the systolic array.

In some examples, the system may further include a right-hand matrix register configured to receive the right-hand side data from the first matrix staging register and load the received right-hand side data into the processing cells of the systolic array, and a left-hand matrix register configured to receive the left-hand side data from the second matrix staging register and pass the received left-hand side data to the systolic array.

In some examples, each of the plurality of vector registers, the first matrix staging register, the second matrix staging register, the left-hand matrix register, the right-hand matrix register and the systolic array may be formed on an integrated chip.

In some examples, the one or more processors may be configured to: in response to the first instruction indicating to transpose the right-hand side data during loading, map a lane dimension of the right-hand side data to a row dimension of the first matrix staging register and a sublane dimension of the right-hand side data to a column dimension of the first matrix staging register; and in response to the first instruction indicating to not transpose the right-hand side data during loading, map the lane dimension of the right-hand side data to the column dimension of the first matrix staging register and the sublane dimension of the right-hand side data to the row dimension of the first matrix staging register.

In some examples, the one or more processors may be configured to: in response to the second instruction indicating to transpose the left-hand side data during loading, map a lane dimension of the left-hand side data to a column dimension of the second matrix staging register and a sublane dimension of the left-hand side data to a row dimension of the second matrix staging register; and in response to the second instruction indicating to not transpose the left-hand side data during loading, map the lane dimension of the left-hand side data to the row dimension of the second matrix staging register and the sublane dimension of the left-hand side data to the column dimension of the second matrix staging register.

In some examples, the one or more processors may be configured to: in each subsequent cycle of the matrix multiplication operation, shift the one or more columns of the left-hand side data to a next column of the systolic array until the column of the left-hand side data reaches a predetermined column of the systolic array; and in a cycle after the one or more columns of the left-hand side data reaches the predetermined column of the systolic array, pass the one or more columns of the left-hand side data back to the left-hand matrix register.

In some examples, the one or more processors may be configured to load right-hand side data and left-hand side data having either integer or floating point format.

In some examples, the one or more processors may be configured to: for right-hand side data and left-hand side data having a 16-bit floating point format, load the right-hand side data and pass the left-hand side data to the systolic array in the 16-bit floating point format; for right-hand side data and left-hand side data having an 8-bit floating point format: convert the 8-bit floating point format to the 16-bit floating point format; and load the converted right-hand side data and pass the left-hand side data to the systolic array in the 16-bit floating point format; for right-hand side data and left-hand side data having an 8-bit integer format, load the right-hand side data and pass the left-hand side data to the systolic array in the 8-bit integer format; and for right-hand side data and left-hand side data having an 4-bit integer format, load the right-hand side data and pass the left-hand side data to the systolic array in the 4-bit integer format.

In some examples, the one or more processors may be configured to: for 8-bit floating point and 16-bit floating point inputs, control the systolic array to output 32-bit floating point results; and for 4-bit integer and 8-bit integer inputs, control the systolic array to output 32-bit integer results.

In some examples, the systolic array may have a size of 128 rows by 128 columns.

Another aspect of the disclosure is directed to a method for performing a matrix multiplication operating using a systolic array, including: loading, by one or more processors, right-hand side data from a plurality of vector registers to a first matrix staging register based at least in part on a first instruction indicating whether to transpose the right-hand side data during loading; loading, by the one or more processors, left-hand side data from the plurality of vector registers into a second matrix staging register based at least in part on a second instruction indicating whether to transpose the left-hand side data during loading; loading, by the one or more processors, the right-hand side data from the first matrix staging register into the systolic array; and in a cycle of the matrix multiplication operation, passing, by the one or more processors, one or more columns of the left-hand side data from the second matrix staging register to a column of the systolic array.

In some examples, loading the left-hand side data from the plurality of vector registers into the second matrix staging register may include: moving the left-hand side data from the second matrix staging register to a left-hand matrix register; and passing the left-hand side data from the left-hand matrix register to the systolic array. Loading the right-hand side data from the plurality of vector registers into the first matrix staging register may include: moving the right-hand side data from the first matrix staging register to a right-hand matrix register; and loading the right-hand side data from the right-hand matrix register into the systolic array.

In some examples, in response to the first instruction indicating to transpose the right-hand side data, loading the right-hand side data from the plurality of vector registers to the first matrix staging register may map a lane dimension of the right-hand side data to a row dimension of the first matrix staging register and a sublane dimension of the right-hand side data to a column dimension of the first matrix staging register, and in response to the first instruction indicating to not transpose the right-hand side data, loading the right-hand side data from the plurality of vector registers to the first matrix staging register may map the lane dimension of the right-hand side data to the column dimension of the first matrix staging register and the sublane dimension of the right-hand side data to the row dimension of the first matrix staging register.

In some examples, in response to the second instruction indicating to transpose the left-hand side data, loading the left-hand side data from the plurality of vector registers into the second matrix staging register may map a lane dimension of the left-hand side data to a column dimension of the second matrix staging register and a sublane dimension of the left-hand side data to a row dimension of the second matrix staging register, and in response to the second instruction indicating to not transpose the left-hand side data, loading the left-hand side data from the plurality of vector registers into the second matrix staging register may map the lane dimension of the left-hand side data to the row dimension of the second matrix staging register and the sublane dimension of the left-hand side data to the column dimension of the second matrix staging register.

In some examples, the method may further include: in each subsequent cycle of the matrix multiplication operation, shifting, by the one or more processors, the one or more columns of the left-hand side data to a next column of the systolic array until the column of the left-hand side data reaches a predetermined column of the systolic array; and in a cycle after the one or more columns of the left-hand side data reaches the predetermined column of the systolic array, passing, by the one or more processors, the one or more columns of the left-hand side data back to the left-hand matrix register.

In some examples, in a first matrix multiplication operation, the right-hand side data loaded into the systolic array and the left-hand side data passed through the systolic array may be in integer format, and in a second matrix multiplication operation the right-hand side data loaded into the systolic array and the left-hand side data passed through the systolic array may be in floating point format.

In some examples, during the first matrix multiplication operation, and in response to the right-hand side data and the left-hand side data having an 8-bit floating point format, the method may include: converting, by the one or more processors, the 8-bit floating point format to the 16-bit floating point format; loading, by the one or more processors, the converted right-hand side data into the systolic array in the 16-bit floating point format; and passing, by the one or more processors, the converted left-hand side data to the systolic array in the 16-bit floating point format. During the second matrix multiplication operation, the method may include, regardless of whether the right-hand side data and left-hand side data have an 8-bit integer format or a 4-bit integer format, loading the right-hand side data and passing the left-hand side data into the systolic array without format conversion.

In some examples, the method may further include: during the first matrix multiplication, controlling the systolic array to output 32-bit floating point results; and during the second matrix multiplication, controlling the systolic array to output 32-bit integer results.

Yet a further aspect of the disclosure is directed to an integrated chip including: a plurality of vector registers storing each of right-hand side data and left-hand side data; and a plurality of matrix multiplication units. Each matrix multiplication unit may include: a respective first matrix staging register having two or more rows and two or more columns and configured to receive right-hand side data from the plurality of vector registers; a respective second matrix staging register having two or more rows and two or more columns and configured to receive left-hand side data from the plurality of vector registers; and a respective systolic array configured to: receive the right-hand side data from the respective first matrix staging register and the left-hand side data from the respective second matrix staging register; and conduct a matrix multiplication operation using the right-hand side data and the left-hand side data.

In some examples, the first matrix staging register may be configured to receive a matrix of either transposed or un-transposed right-hand side data, the second matrix staging register may be configured to receive a matrix of either transposed or un-transposed left-hand side data, and transposition of the right-hand side data and left-hand side data may be determined according to a mapping instruction directing the loading of the right-hand side data and left-hand side data into the first and second matrix staging registers.

DETAILED DESCRIPTION

Overview

A matrix multiplication unit (MXU) is arranged to perform transposition of left-hand side data without using a dedicated transpose unit. This is accomplished by providing an additional matrix storage register at the MXU and mapping the lanes and sublanes of the vector registers storing the left-hand side data to the rows and columns of the matrix holding register. An instruction to perform the matrix multiplication operation may include directions indicating whether or not to transpose the left-hand side data.

In addition to facilitating transposition of the left-hand side data at the MXU, the matrix holding register can also facilitate persistence of the left-hand side data at the MXU, meaning that the left-hand side data can be maintained at the MXU for future operations without needing to be fetched again from the vector registers. This can be accomplished by streaming the left-hand side data into one side of the systolic array, and as the data flows through the systolic array, passing the data exiting the opposite end of the systolic array back to the matrix holding register.

The disclosed MXU architecture provides the advantage of reducing latency for matrix multiplication operations involving transposition of left-hand side data since the data does not have to be passed over the device bus multiple times. This also has the advantage of reducing bandwidth requirements for performing the matrix multiplication operations, thereby increasing overall processing times and efficiency for MXUs and chips containing one or more MXUs.

Example Systems

Figure 1:
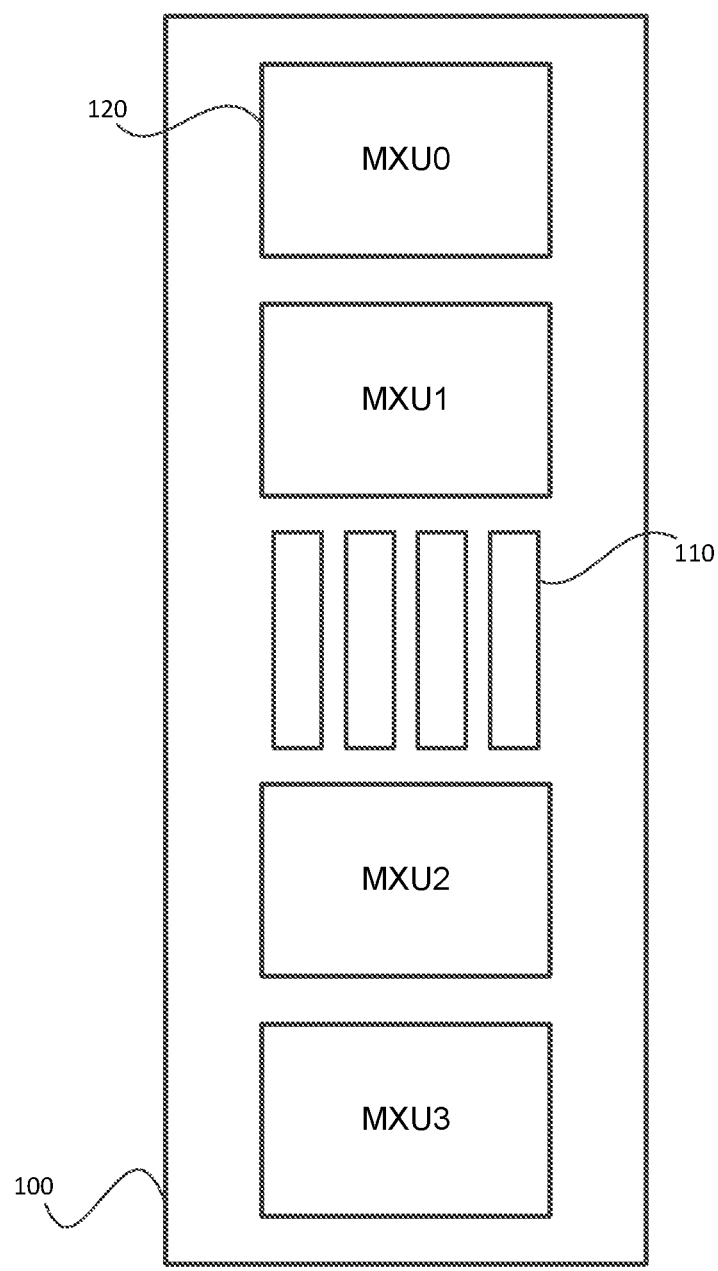
FIG. 1 is a block diagram of a chip in accordance with an aspect of the present disclosure.

FIG. 1 is a diagram of an example device 100 in accordance with an aspect of the present disclosure. The device 100 may be an integrated circuit (IC) or chip configured to store data in one or more storage registers 110 and process the stored data using one or more matrix multiplication units (MXUs) 120. The MXUs may be specially designed to efficiently conduct matrix multiplication operations. The efficient performance of matrix multiplication operations can be beneficial for various applications, such as neural networks and other machine learning algorithms.

The storage registers 110 may be vector registers in which the data stored in the vector register may be divided into a plurality of cells, and data within each cell may further be subdivided into smaller portions. As such, although the structure of the vector register 110 is itself one-dimensional, the data stored within the vector register 110 may be two-dimensional, and may further be expanded into a two-dimensional form or "array." For example, each cell of the vector register may correspond to a respective lane over which data is transferred from the vector register to the MXU 120, whereby each portion of data within the cell may correspond to an individual sublane of the cell's lane.

Each of the storage registers 110 may be connectable to pass data to any one or combination of the MXUs 120. Additionally, the MXUs 120 may operate independently of one another. Therefore, data passed from the storage registers 110 to the MXUs may be passed to and subsequently processed by the multiple MXUs 120 in parallel.

In the example of FIG. 1, a plurality of storage registers 110 are represented as four boxes, although the number of storage registers and amount of available storage space may vary depending on the particular chip and design. Also, in FIG. 1, four MXUs 120 labeled MXU0, MXU1, MXU2, and MXU3 are shown, although the number of MXUs may also vary depending on the particular applications for which the chip 100 is designed.

Figure 2:
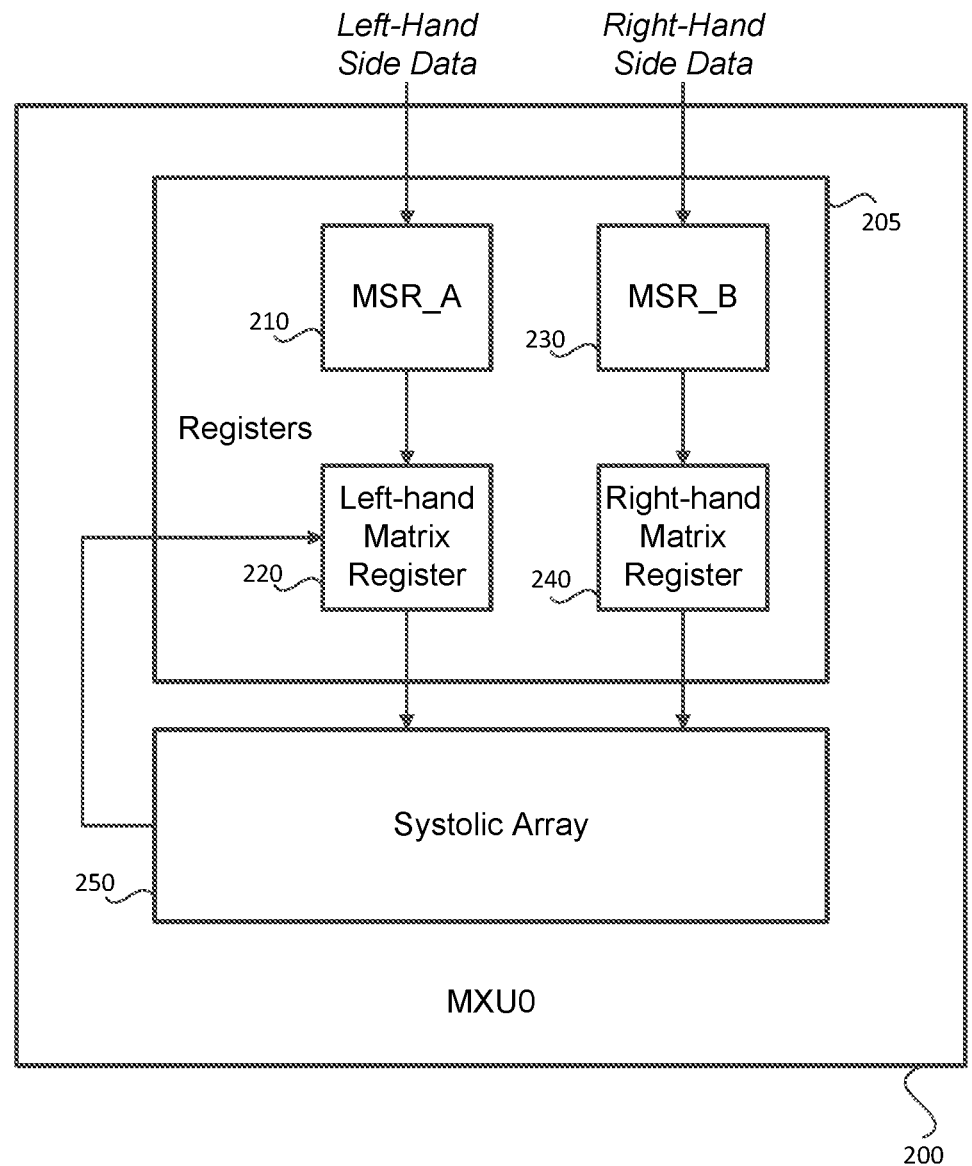
FIG. 2 is a block diagram of a matrix multiplication unit (MXU) in accordance with an aspect of the present disclosure.

FIG. 2 is a block diagram illustrating an MXU 200, such as one of the MXUs of the device 100 of FIG. 1, and an example data flow within the MXU 200. As shown in FIG. 2, the MXU 200 may include a plurality of registers 205 and a systolic array 250.

A first register 210 may be configured to receive a first portion of data from the vector registers of the device, and a second register 220 may be configured to receive a second portion of data from the vector registers. Each of the first and second portions of data may correspond to the left-hand and right-hand side data to be used in the matrix multiplication operation of the MXU, whereby each of the left-hand side data and the right-hand side data represents a respective matrix, and a result of the matrix-multiplication application is derived by multiplying the respective matrices of the left-hand and right-hand side data with one another.

Each of the registers 210, 220, 230, 240 may be configured to store the data received from the vector registers in matrix form, whereby the rows and columns of the registers may correspond or map to the lanes and sublanes of the vector registers or vice versa. As discussed herein, the mapping of rows to lanes or sublanes may vary depending on instructions provided to the MXU during transfer of the data from the vector register to the MXU 200.

The systolic array 250 may be configured to receive the matrices of left-hand side and right-hand side data from the registers 210, 220, 230, 240. In some cases, data may be loaded into all of the cells of the systolic array 250 in advance of conducting the matrix multiplication operations, and which in some cases may be passed to a first column of cells in the systolic array 250 at a first cycle of processing, and the data may be advanced one column further through the systolic array for each cycle. In the examples of the present disclosure, the right-hand side data is shown as being loaded into the systolic array 250 in advance of the matrix multiplication operation, and the left-hand side data is shown as being passed one column per cycle through the systolic array 250. In other implementations, it is possible to pass both the left-hand and right-hand side data at a one-row or one-column per cycle basis.

In the example of FIG. 2, each of the left-hand side and right-hand side data passes through two registers while being moved from the vector registers to the systolic array 250. In the case of the left-hand side data, a first matrix staging register (MSR_A) 210, first receives the left-hand side data from the vector registers, a left-hand matrix register 220 then receives the data from the first matrix staging register 210, and the left-hand data is passed to the systolic data 250 from the left-hand matrix register 220. Similarly, a second matrix staging register (MSR_B) 230, first receives the right-hand side data from the vector registers, a right-hand matrix register 240 then receives the data from the second matrix staging register 230, and the right-hand data is loaded into the systolic data 250 from the right-hand matrix register 240.

The use of matrix staging registers 210, 230 to load the left-hand side and right-hand side data, respectively, into the left-hand matrix 220 and right-hand matrix 240 may provide several benefits. For example, data may be converted from a format that is not supported by the systolic array to a format that is supported during the loading. In one such example, the systolic array may support computation of 16-bit floating point values, but not 8-bit floating point values. In such a case, the first and second matrix staging registers 210, 230 may receive operands having 8-bit floating point values from the vector registers, and convert these operands to 16-bit floating point values during the respective data transfers from the matrix staging registers 210, 230 to the left-hand matrix register 220 and the right-hand matrix register 240. For further example, data sent to a matrix staging register may be masked using a vector mask register. This can allow certain lanes, sublanes, or even individual values from the vector registers to be forced to a value of zero as the data is provided to the left-hand matrix register 220 or the right-hand matrix register 240. However, in some examples, it may be possible to skip the matrix staging registers and to provide the data directly from the vector registers to the left-hand matrix register 220 and the right-hand matrix register 240.

In addition to moving the left-hand side data and right-hand side data from the matrices 220, 240 to the systolic array, the MXU 200 of the present disclosure also provides for persistent storage of the left-hand side data and right-hand side data so that the data may be called and utilized in subsequent operations without having to be fetched from the vector registers additional times. This can save time for performing multiple matrix multiplication operations using the same data, as well as save bus bandwidth that would otherwise be used to transport the data between the vector registers and the MXUs.

In the case of left-hand side data, the data may be pushed through the respective columns of the systolic array at a rate of one column per cycle. The left-hand side data may begin at a first column of cells of the systolic array, and move one column per cycle until reaching an opposite end of the systolic array, whereby the data may be passed back to the left-hand matrix register for further storage until the data is ready to be used at a later time. It should be noted that when left-hand side data is loaded into the first column of the systolic array, in some cases, more than one column of left-hand side data may be loaded into the first column. For example, the cells of the systolic array may be equipped with duplicate circuitry designed for processing respective columns of the left-hand matrix register in parallel with one another. Furthermore, it should be noted that while the left-hand side data is capable of being pushed one column at a time from one end of the systolic array to the opposite end, in some examples, the same or similar principles may be implemented in a manner that results in the left-hand side data being pushed only partway through the systolic array before being returned to the left-hand matrix register.

In the case of right-hand side data, the data from each column of the right-hand matrix register may be copied to all of the cells of the corresponding column of the systolic array whereby a copy of the data may also remain in the right-hand matrix register for storage until the data is ready to be used at a later time.

Figure 3:
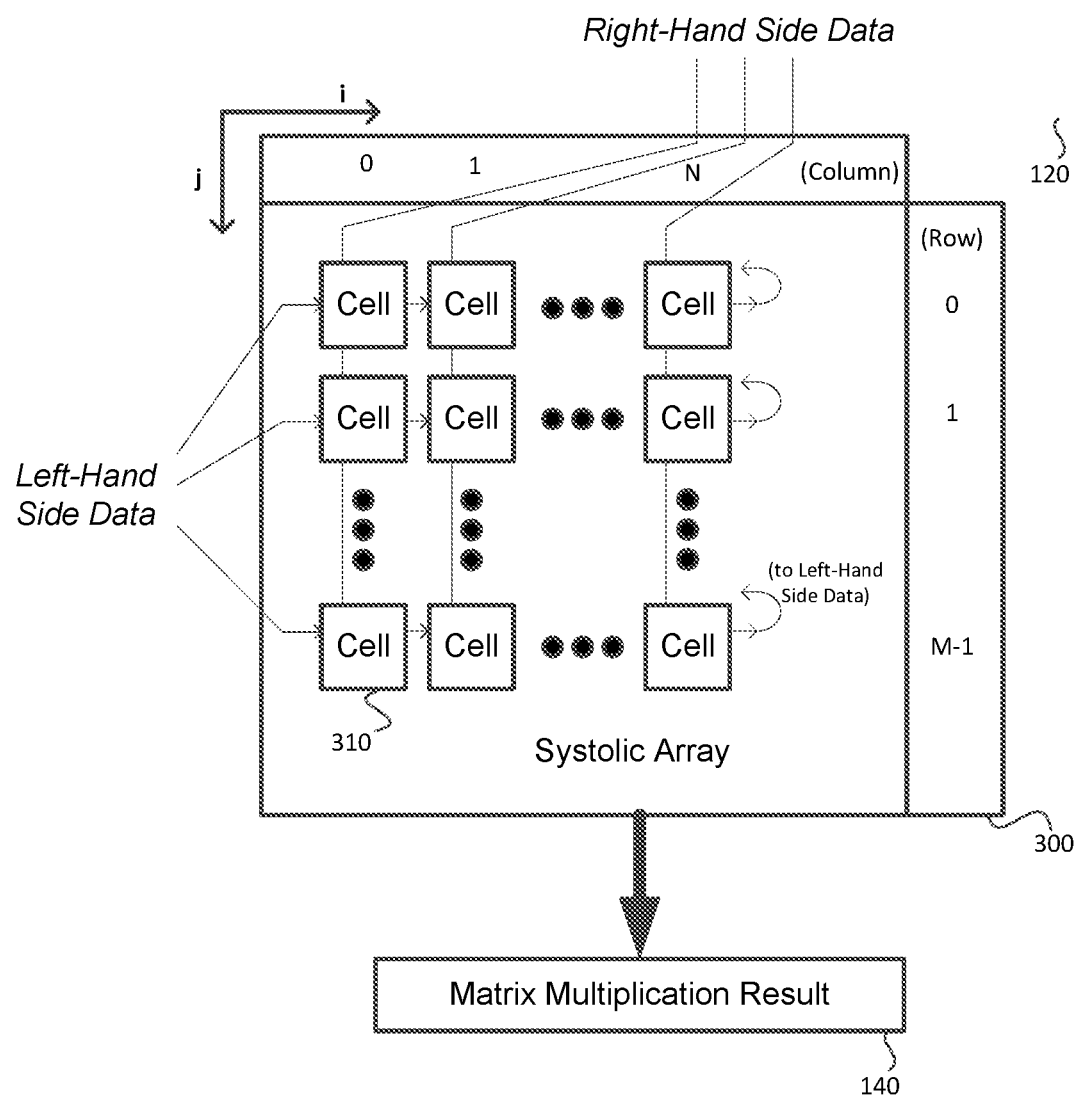
FIG. 3 is a block diagram of an example systolic array in accordance with an aspect of the present disclosure.

FIG. 3 is a diagram of an example systolic array 300, such as the systolic array 250 of the example MXU of FIG. 2. The systolic array 300 is shown as having a plurality of cells 310 arranged in an [I,J] array having I rows and J columns.

Each of the cells 310 may be loaded with the right-hand side data from the right-hand matrix register. Typically, each data element loaded into a respective cell corresponds to a separate operand for matrix multiplication operations, although in some circumstances, each data element may contain multiple operands.

A first column [0] of the cells 310 may also receive the left-hand side data from the left-hand matrix register. As with the right-hand side data, each data element of the left-hand side data typically corresponds to a separate operand for matrix multiplication operations, although in some circumstances, each data element may contain multiple operands.

In some examples, the systolic array may be stationary, meaning that the entire right-hand matrix register is loaded in advance and remains stationary in the array during matrix multiplication. In other examples, a vector of right-hand side data may be loaded per cycle, making the systolic array non-stationary. The decision between a stationary or non-stationary array may be influenced by timing considerations within the systolic array, such as control flow direction and pipelining.

Each cell 310 of the systolic array 300 may be responsible for receiving a portion of right-hand side data, receiving a portion of left-hand side data, receiving an output from a previous cell in the same row, calculating a product of the received portions of right-hand side and left-hand side data, adding the calculated product to the output from a previous cell, and passing the sum to the next cell in the same row. For instance, in the case of a given cell [i.j] of the systolic array, the right-hand side data loaded into the cell received may correspond to a column [n] of a right-hand matrix register 120 having dimensions M×N, the left-hand side data that is passed through the cell may correspond to a row [m] of a left-hand vector register 130 having dimensions M×N, an output may be received from cell [i-1.j], a product of the received portions of [m] and [n] may be calculated and added to the output from cell [i-1.j], and the sum may be forwarded to the next cell [i+1.j]. Ultimately, the calculations performed by each of the cells 310 may amount to the matrix multiplication result 320.

The manner in which the data from the vector registers is ultimately loaded into the systolic array 300 can affect the matrix multiplication result 320 that is outputted from the systolic array. For instance, if the rows and columns of one or both of the left-hand and right-hand data were transposed with one another, such that the systolic array is provided with one or more transposed matrix inputs, the matrix multiplication result may be changed. Additionally, the amount of processing needed to arrive at the matrix multiplication result 320 may also be changed, meaning that in some circumstances, setting up a matrix multiplication operation using transposed matrices may result in a more efficient operation.

When data is moved from the vector registers to the MXU, one or more instructions may be provided with the data. The instructions may indicate a format of the data, such as whether the values contained in the data are 4-bit integer values, 8-bit integer values, 8-bit floating point values, 16-bit floating point values, and so on. The instructions may further indicate whether or not to transpose the data as it is moved to the MXU. The instructions for transposition may be characterized in terms of whether the lane and sublane dimensions of the vector registers are respectively mapped to the row and column dimensions of the matrix staging register or respectively mapped to the column and row dimensions of the matrix staging register.

First, with consideration to the right-hand side data, in the case of an instruction to transpose the right-hand side data, a lane dimension of the right-hand side data may be mapped to a row dimension of the matrix staging register and a sublane dimension of the right-hand side data may be mapped to a column dimension of the matrix staging register. Conversely, in the case of an instruction to not transpose the right-hand side data during loading, the lane dimension of the right-hand side data may be mapped to the column dimension of the matrix staging register and the sublane dimension of the right-hand side data may be mapped to the row dimension of the matrix staging register.

Next, with consideration to the left-hand side data, in an arrangement of an MXU including only the matrix staging register and not the second left-hand matrix register, the mapping of the left-hand side data between the vector registers and the MXU may follow the same principles as the right-hand side data. However, in an arrangement of the MXU including both the matrix staging register and the left-hand matrix register, due to the physical layout of the left-hand matrix register vis-à-vis the matrix staging register, the data is inevitably transposed when moved from the matrix staging register to the left-hand matrix register. Therefore, in order to ensure transposition of the left-hand data, the left-hand data should not be transposed when moving it to the matrix holding register. Conversely, in order to ensure that the left-hand data is not transposed when passed through the systolic array, the left-hand data should be transposed when moving it to the matrix holding register so that the second transposition at the left-hand matrix register returns the left-hand side data to its original form.

Figure 4A:
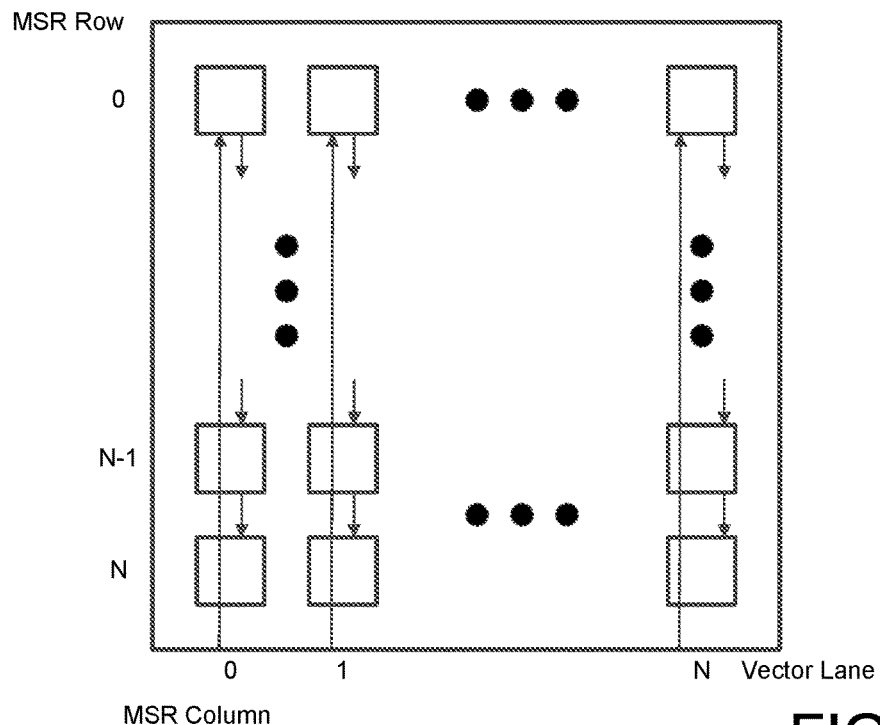
FIGS. 4A and 4B are graphs illustrating mappings of left-hand side operand data between registers and the systolic array in the MXU of FIG. 2.
Figure 4B:
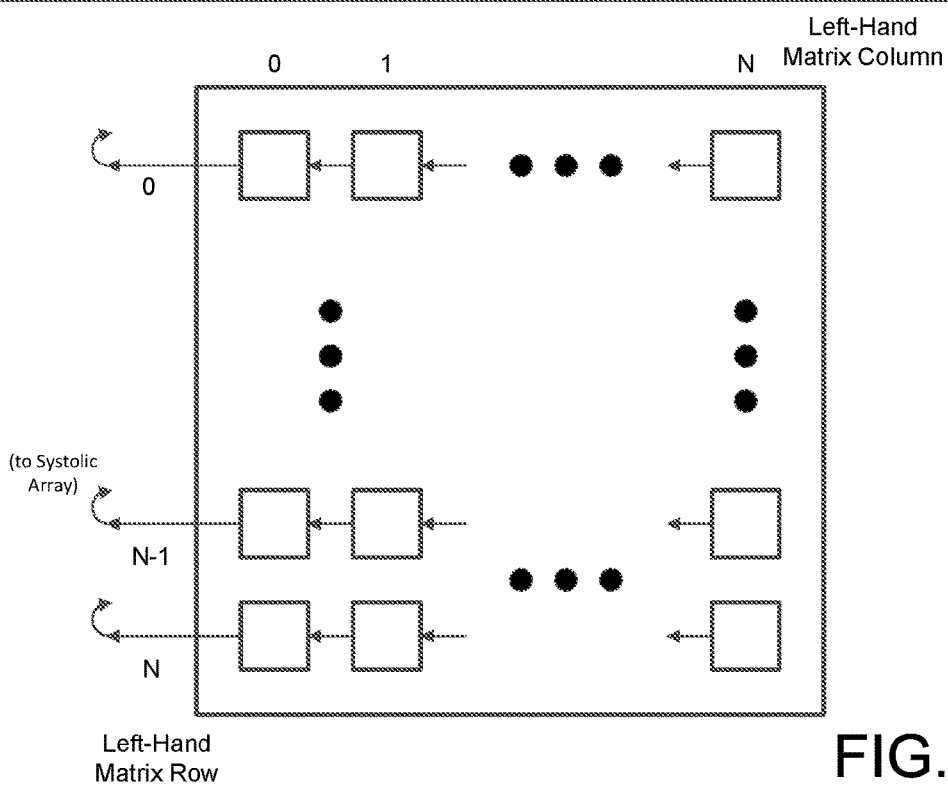

FIGS. 4A and 4B illustrate the steps for transposing the rows and columns of the left-hand data when the MXU includes both a second matrix staging register for the left-hand data and a left-hand matrix register. Beginning at FIG. 4A, the left-hand side data may be stored in the vector registers and moved to the matrix staging register (MSR). Each lane of the vector register may correspond to a respective row of the matrix staging register, meaning that at the initial stage of moving the left-hand side data into the MXU, the data is not transposed. As shown in FIG. 4A, the sublane values of each lane may be pushed through the rows of the matrix staging register until each row of the matrix staging register contains the values of a corresponding sublane of the vector registers.

Next, at FIG. 4B, the columns of the left-hand matrix register can be seen being pushed to the rows of the systolic array one column at a time. As noted herein, in some examples, multiple columns may be sent to the systolic array in a single cycle. In either case, the matrix received at the systolic array through the matrix staging register and the left-hand matrix register is transposed compared to how the data would have appeared if it were loaded directly from the vector registers to the systolic array.

It should be noted that the right-hand data loaded into the systolic array from the right-hand matrix register is not unconditionally transposed like the left-hand data passed into the systolic array from the left-hand matrix register. Therefore, it should be appreciated that the manner in which to-be-transposed right-hand data is moved into the matrix staging register is the opposite from the manner in which to-be-transposed left-hand data is moved into the matrix staging register. Stated another way, when dealing with untransposed left-hand data, it is necessary to either send the data directly to the systolic array or transpose the data twice to return it to its original format. By contrast, when dealing with untransposed right-hand data, it is not necessary to transpose the data even once, as the data may remain in its original format throughout the process.

In the above examples, each matrix staging register is shown as being dedicated to one of left-hand or right-hand data. However, in practice, each matrix staging register may actually be switchably connected to any of the vector registers and to either one of the left-hand matrix register or the right-hand matrix register. Therefore, the matrix staging register also makes it possible for the left-hand data to be reused in subsequent matrix multiplication operations as right-hand data, or for the right-hand data to be reused in subsequent matrix multiplication operations as left-hand data.

Figure 5:
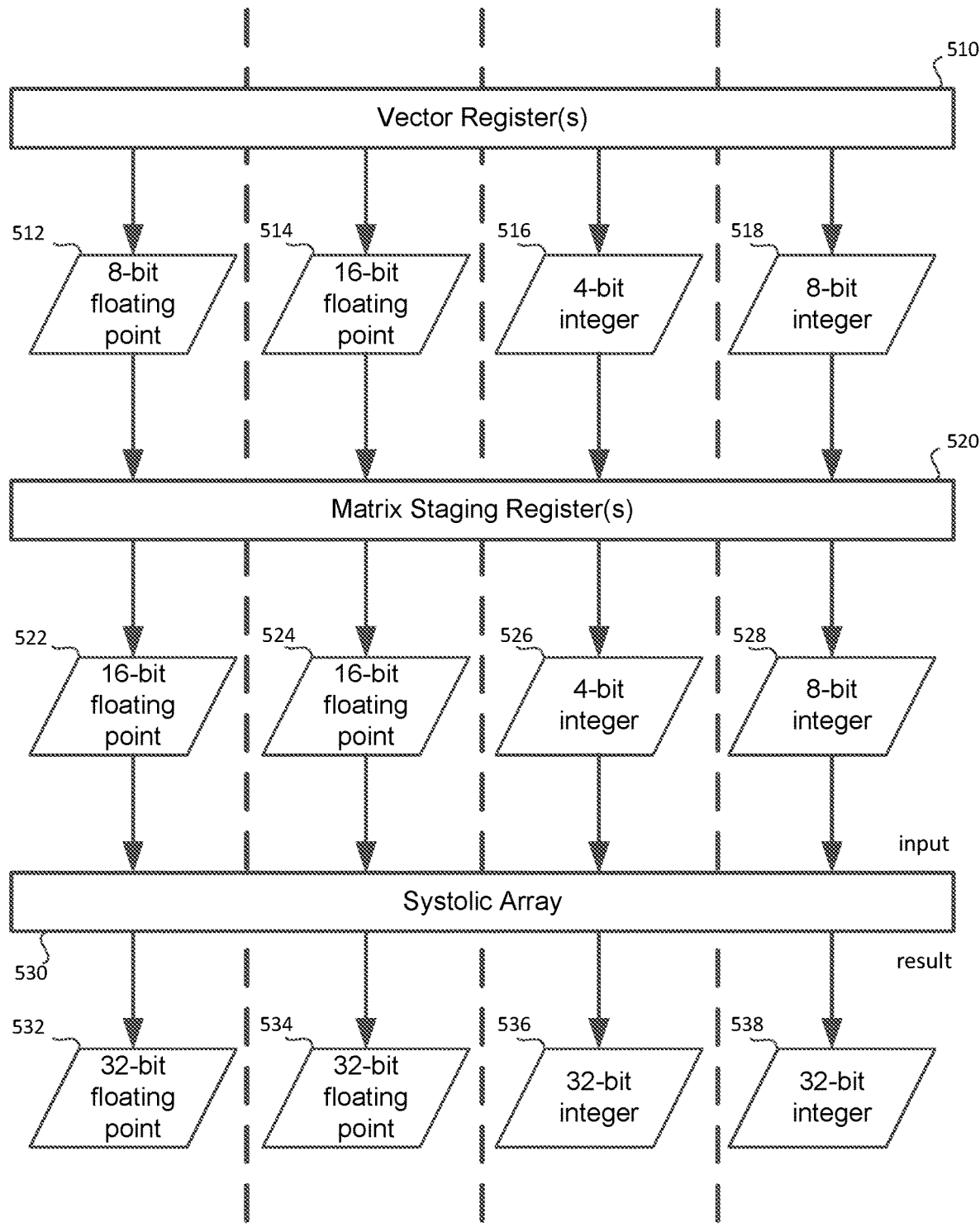
FIG. 5 is a block diagram illustrating inputs and outputs of an example MXU in accordance with aspects of the present disclosure.

Also, in the above examples, the systolic array may be configured to support several data types, including even data types that are not supported by the systolic array. For example, the systolic array may not be able to process 8-bit floating point values, but those values may be converted to 16-bit format during the transfer from the matrix staging register to the left-hand matrix register, right-hand matrix register, or both. FIG. 5 illustrates a few example data formats that may be received by the example systolic arrays of the present disclosure, as well as the data formats that are output or processed in intermediate steps. As shown in FIG. 5, the vector registers 510 may provide any one of an 8-bit floating point input 512, a 16-bit floating point input 514, a 4-bit integer input 516, or an 8-bit integer input 518. Each type of input may be received and stored at one or more matrix staging registers 520, and further transmitted to the systolic array 530 in the same format, except for the 8-bit floating point 512 format, which may be converted to a 16-bit floating point format 522 while being moved from the matrix staging register 520 to the left-hand matrix register, right-hand matrix register or systolic array 530. In the case of a 16-bit floating point input 522, 524 into the systolic array 530, the output of the matrix multiplication operation may be a 32-bit floating point value 532, 534. In the case of a 4-bit integer input 526 or an 8-bit integer input 528 into the systolic array 530, the output of the matrix multiplication operation may be a 32-bit floating point value 536, 538.

Figure 6:
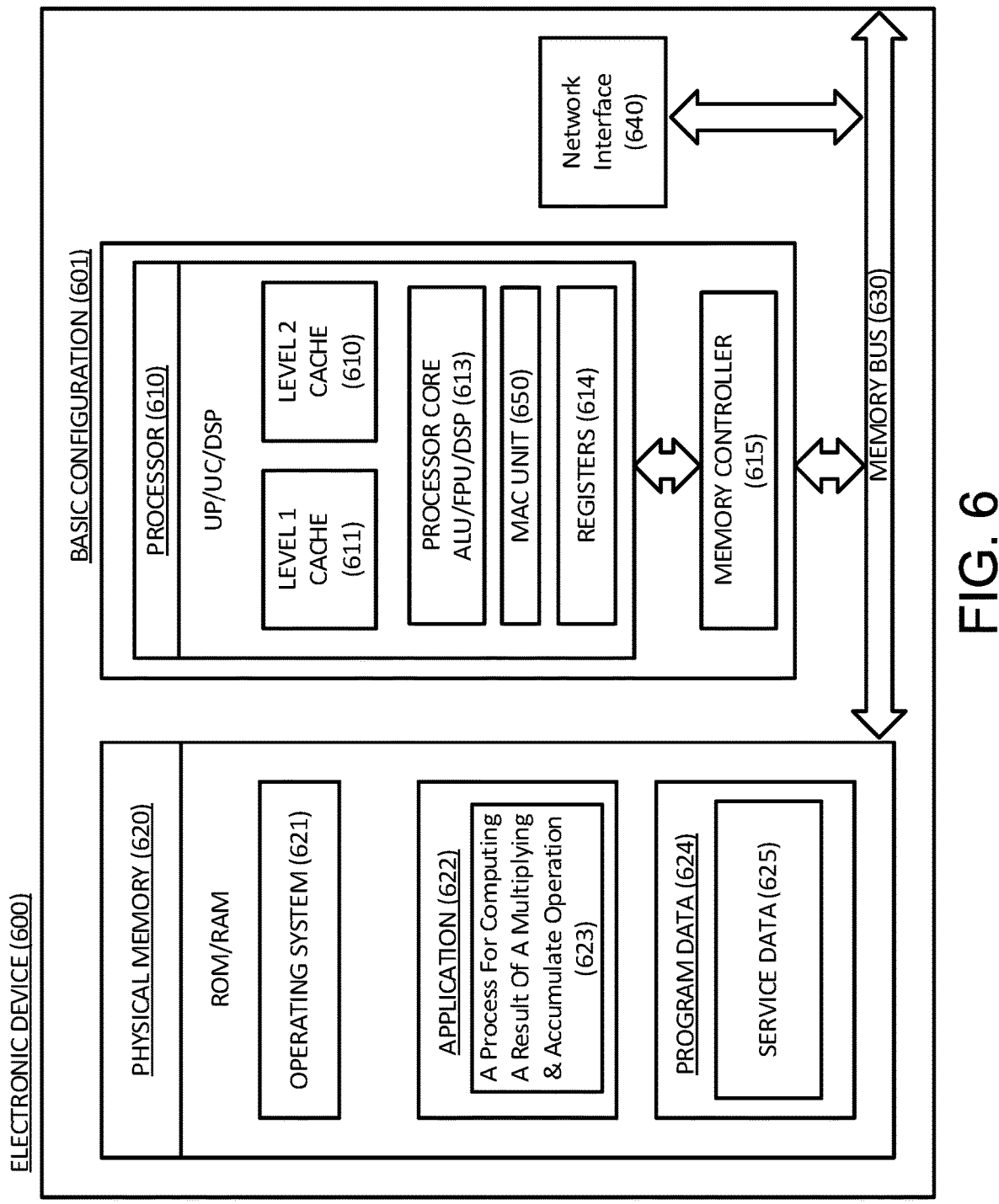
FIG. 6 is a block diagram of an example electronic device in accordance with an aspect of the disclosure.

FIG. 6 depicts a block diagram of an example electronic device 600 for implementing a systolic array in accordance with any of the example embodiments of the present disclosure. The electronic device 600 may include one or more processors 610, such as one or more CPUs, system memory 620, a bus 630, the networking interface(s) 640, and other components (not shown), such as storage(s), output device interface(s), input device interface(s). A bus 630 may be used for communicating between the processor 610, the system memory 620, the networking interface(s) 640, and other components. Any or all components of electronic device 600 may be used in conjunction with the subject of the present disclosure.

Depending on the desired configuration, the processor 610 may be of any type including but not limited to one or more central processing units (CPUs), graphic processing units (GPUs), field-programmable gate arrays (FPGAs), and/or application-specific integrated circuits (ASICs), such as tensor processing units (TPUs), or any combination thereof. The processor 610 may include the systolic array. The processor 610 may include one more level of caching, such as a level one cache 611 and a level two cache 612, a processor core 613, and registers 614. The processor core 613 may include one or more arithmetic logic units (ALU), one or more floating point units (FPU), one or more DSP cores, or any combination thereof. A memory controller 615 may also be used with the processor 610, or in some implementations the memory controller 615 can be an internal part of the processor 610.

Depending on the desired configuration, the physical memory 620 may be of any type including but not limited to volatile memory, such as RAM, non-volatile memory, such as ROM, flash memory, etc., or any combination thereof. The physical memory 620 may include an operating system 621, one or more applications 622, and program data 624, which may include service data 625. Non-transitory computer-readable medium program data 624 may include storing instructions that, when executed by the one or more processing devices, implement a process for computing the result of a multiply and accumulate operation 623. In some examples, the one or more applications 622 may be arranged to operate with program data 624 and service data 625 on an operating system 621.

The electronic device 600 may have additional features or functionality, and additional interfaces to facilitate communications between the basic configuration 601 and any required devices and interfaces.

Physical memory 620 may be an example of computer storage media. Computer storage media includes, but is not limited to, RAM, ROM, EEPROM, flash memory or other memory technology, or any other medium which can be used to store the desired information and which can be accessed by electronic device 600. Any such computer storage media can be part of the device 600.

Network interface(s) 640 may couple the electronic device 600 to a network (not shown) and/or to another electronic device (not shown). In this manner, the electronic device 600 can be a part of a network of electronic devices, such as a local area network ("LAN"), a wide area network ("WAN"), an intranet, or a network of networks, such as the Internet. In some examples, the electronic device 600 may include a network connection interface for forming a network connection to a network and a local communications connection interface for forming a tethering connection with another device. The connections may be wired or wireless. The electronic device 600 may bridge the network connection and the tethering connection to connect the other device to the network via the network interface(s) 640.

The systolic array may include a plurality of MAC units 650 to perform multiply and accumulate operations needed for matrix multiplication. The MAC units 650 and the systolic array in which it operates may be used in an accelerator that may be used for DNN implementations.

The electronic device 600 may be implemented as a portion of a small form factor portable (or mobile) electronic device such as a speaker, a headphone, an earbud, a cell phone, a smartphone, a smartwatch, a personal data assistant (PDA), a personal media player device, a tablet computer (tablet), a wireless web-watch device, a personal headset device, a wearable device, an application-specific device, or a hybrid device that include any of the above functions. The electronic device 600 may also be implemented as a personal computer including both laptop computer and non-laptop computer configurations. The electronic device 600 may also be implemented as a server, an accelerator, or a large-scale system.

Example Methods

Figure 7:
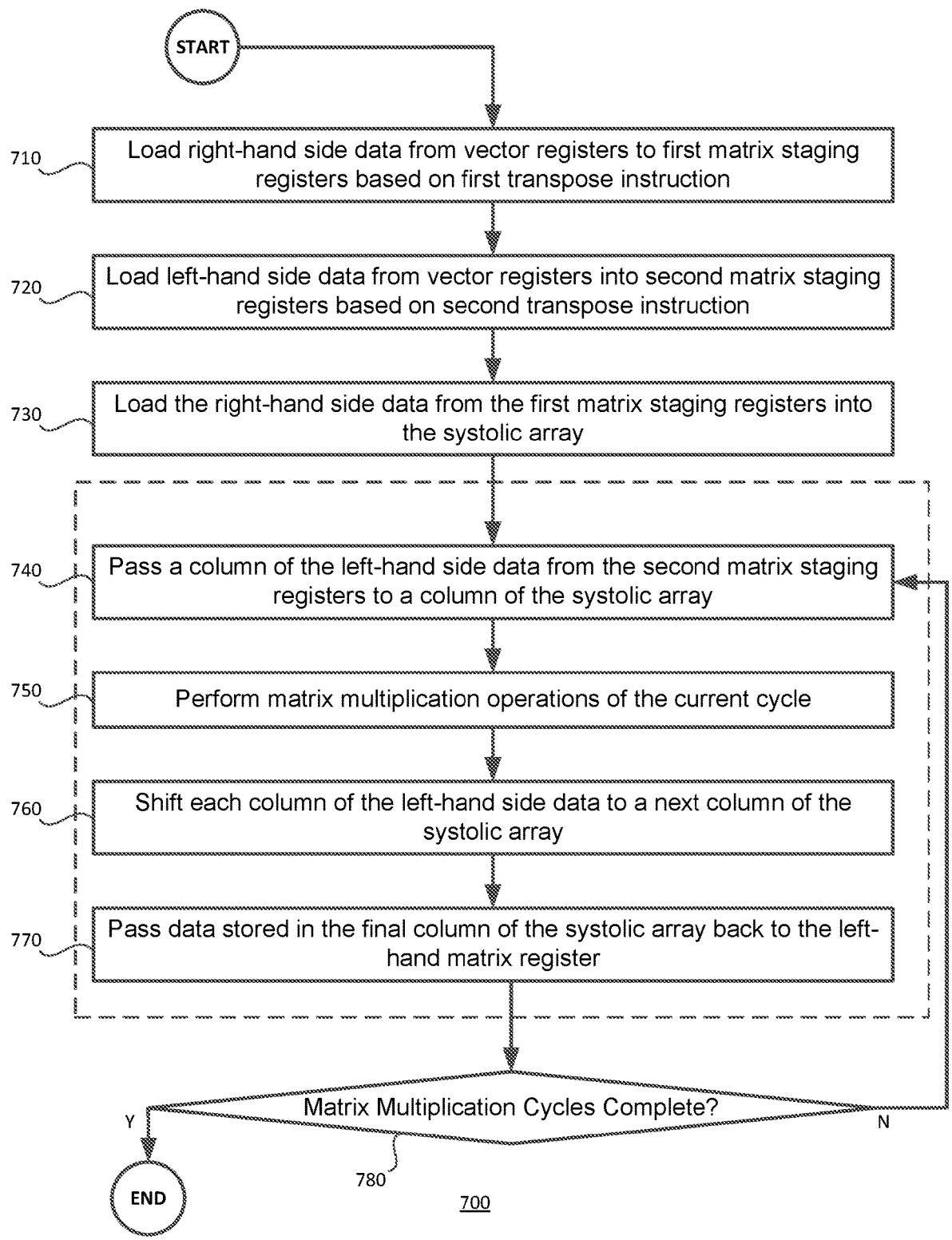
FIG. 7 is a flow diagram of an example routine for loading and passing data in a systolic array in accordance with an aspect of the disclosure.

FIG. 7 is a flow diagram illustrating an example routine 700 for controlling the transposition of data in an MXU of the present disclosure. The routine 700 may be executed by the one or more MXUs included in the system, such as the example MXU shown in FIG. 2.

At block 710, right-hand side data is loaded from vector registers to first matrix staging registers based on a first transpose instruction. The transpose instruction may indicate whether the right-hand side data should be loaded into the systolic array in transposed or untransposed form. To transpose the right-hand side data, the lanes of the vector registers may be mapped to the rows of the matrix staging register used to hold the right-hand side data. Conversely, to not transpose the right-hand side data, the lanes of the vector registers may be mapped to the columns of the matrix staging register used to hold the right-hand side data.

At block 720, left-hand side data is loaded from vector registers to second matrix staging registers based on a second transpose instruction. The transpose instruction may indicate whether the left-hand side data should be loaded into the systolic array in transposed or untransposed form. To transpose the left-hand side data, the lanes of the vector registers may be mapped to the columns of the matrix staging register used to hold the left-hand side data, so that the data will become transposed subsequently when moved from the matrix staging register to the left-hand matrix register. Conversely, to not transpose the left-hand side data, the lanes of the vector registers may be mapped to the rows of the matrix staging register used to hold the left-hand side data, so that the data will become un-transposed subsequently when moved from the matrix staging register to the left-hand matrix register.

At block 730, the right-hand side data is loaded from the first matrix staging registers into the systolic array. This may involve first loading the right-hand side data into a right-hand matrix register and then loading the right-hand data from the right-hand matrix register into the systolic array. In some examples, loading the right-hand side data may be performed entirely before matrix multiplication operations begin. Alternatively, loading the right-hand side data may be performed by moving one or more columns of right-hand side data into the systolic array at every cycle of the matrix multiplication operations.

In the example of FIG. 7, blocks 740-770 may be repeatedly performed until the matrix multiplication operations are complete. At block 740, a column of the left-hand side data from the second matrix staging registers may be passed to a column of the systolic array. This may involve first loading the left-hand side data into a left-hand matrix register and then passing the left-hand data from the left-hand matrix register into the systolic array. At block 750, the current cycle of matrix multiplication operations may be performed. The matrix multiplication operations may involve a dot product accumulator calculating a multiplication result for a left-side operand and a right-side operand in each occupied cell of the systolic array and adding it to corresponding multiplication results derived in previous cycles of the matrix multiplication operations. At block 760, each column of the left-hand side data in the systolic array may be shifted to a next column of the systolic array. The data may be shifted one cell over per cycle, such that all left-hand data appears in each column of the systolic array for one respective cycle. At block 770, data that is stored in the final column of the systolic array may be passed back to the left-hand matrix register for storage.

At block 780, it is determined whether the matrix multiplication operation has been completed and the left-hand data has been passed through all the columns of the systolic array and returned to the left-hand matrix register. If the operation is complete and the left-hand data is returned, then operations may conclude. Otherwise, if the operation is not complete and the left-hand data is still passing through the systolic array, then operations may revert to block 740 in which a next column of left-hand side data is passed from the second matrix staging register to the first column of the systolic array. Operations may loop between blocks 740-780 until all computations are complete.

In the example of FIG. 7, the data is described as reverting to matrix staging registers, although in other examples, left-hand and right-hand matrix registers may be positioned between the matrix staging registers and the systolic array, and the data may be returned to the left-hand and right-hand matrix registers. Also, in the example of FIG. 7, the left-hand side data is described as being passed one column at a time to the systolic array. However, in some examples, more than one column of left-hand side data may be passed within a single cycle In effect, the routine 700 of FIG. 7 is effective for controlling the transposition of not only right-hand side data but also left-hand side data at the MXU, whereby either one or both of the right-hand side data and left-hand side data may be transposed before performing the matrix multiplication operations. This provides greater flexibility and versatility in setting up the data before computation, which in turn can increase efficiency of the computations by setting up the data in an efficient form in advance. Furthermore, the routine provides for the persistence of the right-hand side data and the left-hand side data at the MXU, such that the data may be reused for future computations without having to communicate with components outside of the MXU, such as the vector registers. This persistence can provide increased efficiency for large computations by reducing the bus bandwidth requirements for the chip on which the MXU is located. It should be recognized that for a chip including additional MXUs for which bus bandwidth is shared among the multiple MXUs, the advantage of reducing the bandwidth requirements is even greater, meaning that efficiency is even further improved for such an arrangement. Stated another way, as the amount of components provided on the chip for matrix multiplication operations scales upward, the efficiency advantage of the routine 700 is further increased.

In one example embodiment of the present disclosure, the systolic array may be used as a matrix multiplication unit (MXU) within a tensor processing unit (TPU). For instance, the TPU may include one or more core processors, and each core processor may be connected to one or more MXUs. The MXU may be an inner product step systolic array processor. The MXU may further be configurable between a shape of 128×128 and 256×128 depending on the data type being received. The MXU may support producing 2×128 24-bit results per cycle for both 8-bit and 4-bit integer operands, and providing 1×128 32-bit floating point results per cycle for both 16-bit and 8-bit floating point operands.

The example MXUs of the present disclosure provide increased versatility and efficiency for matrix multiplication operations by supporting transposition for types of input data using registers located at the MXUs instead of remotely from the MXUs. This helps to reduce an overall footprint of TPUs and other chips incorporating MXUs and systolic arrays therein, without sacrificing processing efficiency.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a plurality of vector registers storing right-hand side data and left-hand side data;
   a first matrix staging register;
   a second matrix staging register;
   a systolic array comprising a matrix of processing cells for conducting a matrix multiplication operation using the right-hand side data and the left-hand side data; and
   one or more processors configured to:
      load the right-hand side data from the plurality of vector registers to the first matrix staging register based on a first instruction indicating whether to transpose the right-hand side data in the systolic array;
      load the left-hand side data from the plurality of vector registers into the second matrix staging register based on a second instruction indicating whether to transpose the left-hand side data in the systolic array;
      load the right-hand side data from the first matrix staging register into the processing cells of the systolic array; and
      in a cycle of the matrix multiplication operation, pass one or more columns of the left-hand side data from the second matrix staging register to a column of processing cells of the systolic array.

2. The system of claim 1, further comprising:
   a right-hand matrix register configured to receive the right-hand side data from the first matrix staging register and load the received right-hand side data into the processing cells of the systolic array; and
   a left-hand matrix register configured to receive the left-hand side data from the second matrix staging register and pass the received left-hand side data to the systolic array.

3. The system of claim 2, wherein each of the plurality of vector registers, the first matrix staging register, the second matrix staging register, the left-hand matrix register, the right-hand matrix register and the systolic array are formed on an integrated chip.

4. The system of claim 2, wherein the one or more processors are configured to:
in response to the first instruction indicating to transpose the right-hand side data during loading, map a lane dimension of the right-hand side data to a row dimension of the first matrix staging register and a sublane dimension of the right-hand side data to a column dimension of the first matrix staging register; and
in response to the first instruction indicating to not transpose the right-hand side data during loading, map the lane dimension of the right-hand side data to the column dimension of the first matrix staging register and the sublane dimension of the right-hand side data to the row dimension of the first matrix staging register.

5. The system of claim 4, wherein the one or more processors are configured to:
in response to the second instruction indicating to transpose the left-hand side data during loading, map a lane dimension of the left-hand side data to a column dimension of the second matrix staging register and a sublane dimension of the left-hand side data to a row dimension of the second matrix staging register; and
in response to the second instruction indicating to not transpose the left-hand side data during loading, map the lane dimension of the left-hand side data to the row dimension of the second matrix staging register and the sublane dimension of the left-hand side data to the column dimension of the second matrix staging register.

6. The system of claim 2, wherein the one or more processors are configured to:
in each subsequent cycle of the matrix multiplication operation, shift the one or more columns of the left-hand side data to a next column of the systolic array until the column of the left-hand side data reaches a predetermined column of the systolic array; and
in a cycle after the one or more columns of the left-hand side data reaches the predetermined column of the systolic array, pass the one or more columns of the left-hand side data back to the left-hand matrix register.

7. The system of claim 1, wherein the one or more processors are configured to load right-hand side data and left-hand side data having either integer or floating point format.

8. The system of claim 2, wherein the one or more processors are configured to:
for right-hand side data and left-hand side data having a 16-bit floating point format, load the right-hand side data and pass the left-hand side data to the systolic array in the 16-bit floating point format;
for right-hand side data and left-hand side data having an 8-bit floating point format:
convert the 8-bit floating point format to the 16-bit floating point format; and
load the converted right-hand side data and pass the left-hand side data to the systolic array in the 16-bit floating point format;
for right-hand side data and left-hand side data having an 8-bit integer format, load the right-hand side data and pass the left-hand side data to the systolic array in the 8-bit integer format; and
for right-hand side data and left-hand side data having an 4-bit integer format, load the right-hand side data and pass the left-hand side data to the systolic array in the 4-bit integer format.

9. The system of claim 8, wherein the one or more processors are configured to:
for 8-bit floating point and 16-bit floating point inputs, control the systolic array to output 32-bit floating point results; and
for 4-bit integer and 8-bit integer inputs, control the systolic array to output 32-bit integer results.

10. The system of claim 1, wherein the systolic array has a size of 128 rows by 128 columns.

11. A method for performing a matrix multiplication operating using a systolic array, the method comprising:
loading, by one or more processors, right-hand side data from a plurality of vector registers to a first matrix staging register based at least in part on a first instruction indicating whether to transpose the right-hand side data during loading;
loading, by the one or more processors, left-hand side data from the plurality of vector registers into a second matrix staging register based at least in part on a second instruction indicating whether to transpose the left-hand side data during loading;
loading, by the one or more processors, the right-hand side data from the first matrix staging register into the systolic array; and
in a cycle of the matrix multiplication operation, passing, by the one or more processors, one or more columns of the left-hand side data from the second matrix staging register to a column of the systolic array.

12. The method of claim 11, wherein:
loading the left-hand side data from the plurality of vector registers into the second matrix staging register comprises:
moving the left-hand side data from the second matrix staging register to a left-hand matrix register; and
passing the left-hand side data from the left-hand matrix register to the systolic array; and
wherein loading the right-hand side data from the plurality of vector registers into the first matrix staging register comprises:
moving the right-hand side data from the first matrix staging register to a right-hand matrix register; and
loading the right-hand side data from the right-hand matrix register into the systolic array.

13. The method of claim 12, wherein:
in response to the first instruction indicating to transpose the right-hand side data, loading the right-hand side data from the plurality of vector registers to the first matrix staging register maps a lane dimension of the right-hand side data to a row dimension of the first matrix staging register and a sublane dimension of the right-hand side data to a column dimension of the first matrix staging register; and
in response to the first instruction indicating to not transpose the right-hand side data, loading the right-hand side data from the plurality of vector registers to the first matrix staging register maps the lane dimension of the right-hand side data to the column dimension of the first matrix staging register and the sublane dimension of the right-hand side data to the row dimension of the first matrix staging register.

14. The method of claim 13, wherein:
in response to the second instruction indicating to transpose the left-hand side data, loading the left-hand side data from the plurality of vector registers into the second matrix staging register maps a lane dimension of the left-hand side data to a column dimension of the second matrix staging register and a sublane dimension of the left-hand side data to a row dimension of the second matrix staging register; and in response to the second instruction indicating to not transpose the left-hand side data, loading the left-hand side data from the plurality of vector registers into the second matrix staging register maps the lane dimension of the left-hand side data to the row dimension of the second matrix staging register and the sublane dimension of the left-hand side data to the column dimension of the second matrix staging register.

15. The method of claim 12, further comprising:
in each subsequent cycle of the matrix multiplication operation, shifting, by the one or more processors, the one or more columns of the left-hand side data to a next column of the systolic array until the column of the left-hand side data reaches a predetermined column of the systolic array; and
in a cycle after the one or more columns of the left-hand side data reaches the predetermined column of the systolic array, passing, by the one or more processors, the one or more columns of the left-hand side data back to the left-hand matrix register.

16. The method of claim 11, wherein in a first matrix multiplication operation, the right-hand side data loaded into the systolic array and the left-hand side data passed through the systolic array is in integer format, and in a second matrix multiplication operation the right-hand side data loaded into the systolic array and the left-hand side data passed through the systolic array is in floating point format.

17. The method of claim 16, wherein during the first matrix multiplication operation, and in response to the right-hand side data and the left-hand side data having an 8-bit floating point format, the method comprises:
converting, by the one or more processors, the 8-bit floating point format to the 16-bit floating point format; and
loading, by the one or more processors, the converted right-hand side data into the systolic array in the 16-bit floating point format; and
passing, by the one or more processors, the converted left-hand side data to the systolic array in the 16-bit floating point format, and wherein during the second matrix multiplication operation, the method comprises, regardless of whether the right-hand side data and left-hand side data have an 8-bit integer format or a 4-bit integer format, loading the right-hand side data and passing the left-hand side data into the systolic array without format conversion.

18. The method of claim 17, further comprising:
during the first matrix multiplication, controlling the systolic array to output 32-bit floating point results; and
during the second matrix multiplication, controlling the systolic array to output 32-bit integer results.

19. An integrated chip comprising:
a plurality of vector registers storing each of right-hand side data and left-hand side data; and
a plurality of matrix multiplication units, wherein each matrix multiplication unit comprises:
a respective first matrix staging register having two or more rows and two or more columns and configured to receive right-hand side data from the plurality of vector registers;
a respective second matrix staging register having two or more rows and two or more columns and configured to receive left-hand side data from the plurality of vector registers; and
a respective systolic array configured to:
receive the right-hand side data from the respective first matrix staging register and the left-hand side data from the respective second matrix staging register; and
conduct a matrix multiplication operation using the right-hand side data and the left-hand side data.

20. The integrated chip of claim 19, wherein:
wherein the first matrix staging register is configured to receive a matrix of either transposed or un-transposed right-hand side data,
wherein the second matrix staging register is configured to receive a matrix of either transposed or un-transposed left-hand side data, and
wherein transposition of the right-hand side data and left-hand side data is determined according to a mapping instruction directing the loading of the right-hand side data and left-hand side data into the first and second matrix staging registers.

* * * * *